United States Patent [19]
Heywood

[11] Patent Number: 5,795,925
[45] Date of Patent: *Aug. 18, 1998

[54] VARNISH WITH SKID RESISTANT UV LIGHT RESISTANT PROPERTIES

[76] Inventor: Newell W. Heywood, 952 Laurel Ave., San Mateo, Calif. 94401

[*] Notice: The term of this patent shall not extend beyond the expiration date of Pat. No. 5,541,239.

[21] Appl. No.: 928,942

[22] Filed: Sep. 12, 1997

Related U.S. Application Data

[63] Continuation-in-part of Ser. No. 669,134, Jun. 24, 1996, abandoned, which is a continuation-in-part of Ser. No. 378,046, Jan. 24, 1995, Pat. No. 5,541,239.

[51] Int. Cl.$^6$ .............. C08J 3/00; C08K 7/16; C08K 9/00; C08L 75/00
[52] U.S. Cl. .............. 523/223; 523/200; 523/206; 524/507
[58] Field of Search ................ 523/223, 200, 523/206; 524/507

[56] References Cited

U.S. PATENT DOCUMENTS

| | | | |
|---|---|---|---|
| 5,274,016 | 12/1993 | Berner | 524/100 |
| 5,541,239 | 7/1996 | Heywood | 523/223 |
| 5,552,496 | 9/1996 | Vogt-Birnbrich | 525/440 |

*Primary Examiner*—Patrick D. Niland
*Attorney, Agent, or Firm*—Robert Samuel Smith

[57] ABSTRACT

A solid film of cured varnish formed from a liquid suspension varnish composition, the film of dried varnish consisting essentially of a solid coherent film polymer constituent formed by the drying of liquid component of said suspension varnish composition and embedded in said solid coherent film polymer solid ultraviolet absorbing crosslinked particles having an average size between 20 to 200 microns in the amount of from about two or three percent by weight or greater based on a weight of said coherent film polymer and methods and composition for making the same are disclosed.

6 Claims, No Drawings

VARNISH WITH SKID RESISTANT UV LIGHT RESISTANT PROPERTIES

CROSS REFERENCE TO PREVIOUS FILED APPLICATIONS

This application is a continuation-in-part of application Ser. No. 08/669,134 filed Jun. 24, 1996 now abandoned which is a continuation-in-part of application Ser. No. 08/378,046 filed Jan. 24, 1995 now issued as U.S. Pat. No. 5,541,239 fr which priority is claimed.

FIELD OF THE INVENTION

This invention relates to varnishes and particularly to a varnish that has additives to improve skid resistance.

PRIOR ART AND INFORMATION DISCLSURE

Varnish is the term applied to a class of coatings that are applied to protect a surface but which are also meant to project visual characteristics of the surface it is intended to cover. The formulations of the first varnishes included drying oils and natural resins. Linseed oil has long enjoyed popular use as a drying oil. Resins used for this purpose include natural oil resin, ester gum, coumarine-indene.

The development of plastics has included the use of polymer resins to produce varnishes with improved properties. Polymer resins have included cross linked polymers requiring catalytic curing, principally epoxies and acetates (plexiglass) and single component coatings such as urethane varnishes that do not require a catalyst, for curing, but which is aided in curing by contact with moisture For example U.S. Pat. No. 5,552,496 to Vogt-Birnbrich et al discloses an aqueous coating composition of urethane resin which is self drying or is cross linked by external agents.

The two part cross linked polymers requiring catalytic cure are characterized by certain mechanical properties that are desired in some situations but are deficient in other respects to polymers. The cross linked polymers are generally harder (stress resistant). The non-crosslinked polymer is generally more pliable and therefore can provide better toughness and adhesion by virtue of its superior ability to tolerate greater strain. The requirement of dealing with two components as required for crosslinked polymer coatings is more of an inconvenience than dealing with single component coatings producing a non-crosslinked coating is an advantage from the standpoint of application.

Another property that often plays a role in the determining the usefulness of a coating is its resistance to degradation from exposure to ultraviolet radiation. Ultraviolet radiation is defined in the American Heritage Dictionary as extending from about 4 nm (0.4 microns) to 380 nm (38 microns).

U.S. Pat. No. 5,274,016 to Berner et al discloses a method for making crosslinked microparticles in the size range from 0.1 microns to 20 microns having ultraviolet absorbers for addition to coatings for the purpose of inhibiting degradation of the coating by exposure to ultraviolet absorption.

Yet another property that must be considered in evaluating coatings is its rheological properties. These properties determine, for example, how thick a coating can be applied to a vertical surface without the coating subsequently "running" (streaking). Obviously, the coating has to be thick enough to provide the required protection but thin enough to prevent running.

SUMMARY

It is an object of this invention to provide a translucent varnish that has superior overall properties in terms of mar resistance, resistance to degradation from ultraviolet radiation, compared to coating of the current art. (Translucent is understood to mean light conducting This invention is directed toward a varnish which in its form, ready for application, includes a carrier fluid and microparticles wherein the microparticles are composed of a translucent cross linked polymer containing a U.V. inhibitor.

The carrier fluid which by itself dries or cures to a a tough adherent translucent coating and can be any one of a one component curing polymer such as urethane or a drying oil such as linseed oil mixed with a resin such as a natural resin, ester gum, coumarin-indene, or modified phenolic resin.

The microparticles are preferably a cross linked polymer such as polycarbonate, styrene, polyurethane or epoxy which are harder, more thermally stable, and confer a greater degree of thermal and mar resistance to the coating than non crosslinked. The average particle size is preferably between 20 and 200 microns and contain an UV absorber. The size of the microparticles is selected to be longer than the top range of ultra violet so as to be effective in providing a coating that has superior UV resistance capabilities. The particle size, being greater than the range claimed by the prior art, also provides a thicker film which has advantages regarding resistance to moisture and wear. The combination of the crosslinked polymer (e.g., pmma) to confer hardness and temperature resistance and the more compliant coating to provide strain resistance provides a coating with enhanced physical properties such as superior mar and skid resistance.

DESCRIPTION OF PREFERRED EMBODIMENTS

The product of this invention is best described by reference to the method of forming the same: accordingly, the best mode for carrying out the invention will be described in method terms.

In general, the method of the invention comprises the steps of preparing a liquid comprising one or more polymers, copolymers or polymer blends that, upon drying cooling or setting forms a coating, a film, layer or sheet or object that is solid and may be flexible or rigid, mixing cross linked particles of a polymer having an average diameter of between 20 and 200 microns that contain ultra violet absorber into the liquid, the particles as suspended until the resulting suspension is used, thereafter forming the resulting suspension in a configuration which may be a coating, sheet, or shape of an object, and then causing the suspension to dry, cool or set to form a solid object such as a film, coating or sheet. The average diameter is chosen specifically to be in the range of 20 to 200 microns in order to confer improved properties of resistance to mar and skid. skid, greater coating thickness without running when applied, greater resistance to UV radiation by virtue of attainable thicker films.

Maintaining the particles in suspension is simply achieved using any of the well known paint formulation techniques. Even though the particle normally have a higher density than the liquid phase, the larger diameter results in a higher viscosity so as to inhibit streaking or running when coatings of a given thickness applied to a vertical surface, The liquid may be a varnish comprising a solution of a polymer system, e.g., a polyurethane, polyacrylate, polyamid, or a blend of these polymers, in a solvent. When the applied varnish dries, the solvent evaporates, forming a coherent film.

The liquid may be a molten polymer into which particles of average diameter 20 to 200 microns are mixed to form the suspension. The particles must not dissolve in the liquid but remain particulate.

An example of of a molten liquid particle suspension is a molten low molecular weight polyolefin, such as polyethylene, polypropylene into which particles of ultraviolet absorber containing polymethacrylate, polyamid, polystyrene etc. is mixed.

The liquid may be a solution or emulsion comprising a polymer system that sets by crosslinking (thermosetting) For example, epoxies and some polyesters are liquids or may be carried in a solvent and remain liquid until a catalyst is added causing the the liquid to set by evaporation and/or cross linking.

Comparable films may be formed that are in emulsion form and set by reaction with absorption of water.

The following examples are provided to illustrate the invention generally.

Oleo resin binders are prepared by reacting drying oils with natural or synthetic resins. The resins include coumarone, indene and kauri resins, producing varnishes that dry to brittle or flexible films depending on the ratio of oil to resin.

Epoxy resins result from reaction of epoxide or oxirane compound with typically bisphenol or phenolic resins. Such resins yield a cross linked polymer having excellent color and chemical resistant but are resistant to UV degradation. Esterfication of epoxides with fatty acids yield epoxy esters having superior chemical resistance, great strength and superior flexibility adhesion and therefore produce good varnishes.

Polyurethane resins formed by the reaction of isocyanates and hydroxyl compounds are among the most important varnish polymer systems, used in industry and marine applications. Polyurethanes used in varnish manufacture are prepared from di-isocyanates which form linear polymers when reacted with diols and crosslinked polymers when reacted with polymers such as polyesters, polyethers of some vegetable oils and water, such varnishes are water and chemical resistant, but are subject to uv degradation. Polyurethane systems formed by air borne moisture cluing but are subject to ultraviolet degradation.

Varnishes may contain a variety of additives to yield particular characteristics, either before application or in the film. Plasticizers are added to increase flexibility. Most varnishes, except those formed by in situ polymerization, are based on a polymer system dispersed in a liquid. Typically, two or may solvents may be used to control drying rate. The applied coating should remain in a gel state, that is permeable to the solvent so that the solvent can evaporate from throughout the film.

Typical solvents include aliphatic hydrocarbons, aromatic hydrocarbons, esters, ketones, glycol ethers and alcohols. Drying accelerators are used in oxidation curing varnishes to increase drying rate. Drying accelerators accelerate the oxidation rate of the unsaturated oil component. Drying accelerators are generally oil soluble organic acid salts of various metals., most of them being naphthalates of lead, cobalt, manganese.

The formulation of typical air drying gloss varnish that may be applied by brushing is given in table 1. which follows:

TABLE I

| Air Drying Varnish | |
|---|---|
| Long oil length drying oil modified alkyd resin in white spirit solvent, 70% weight polymer system 30% by weight solvent | 85 parts |
| Benzotriazole | 2 parts |
| White spirit- | 11 parts |
| Cobalt napthenate, 6% metal content | 0.5 parts |
| Lead napthenate 24% metal content | 1.2 parts |
| methyl ethyl ketoxime anti-skimming solvent | 0.1 |
| All parts by weight | |

There are also standard formulations in the industry, for example, Spar-A and Spar-B varnishes. This is the liquid component of varnish of this invention.

Specifications for several classes of ultraviolet radiation absorbers suitable for use in the present invention are available in the literature and may be obtained from manufacturers: e.g., SANTASE®)Neville Synthese Organics, Inc.) CYSORB UV®(American Cyanamid Co.) UVINUL® (BASF Wyandotte Corp.), TINUVIN®(Ciba-Geigy Corp.), SANDUVOR®(Sandoz Color and Chemicals), SALOL® (Dow Chemical Co.) and EASTMAAN RMB®(Eastman chemical Co. ) is prepared in the form of particles having an average particle size The best mode for carrying out the invention may begin with an alkyd resin-based polymer system such as described in Table-I with Spar-A spar-B or any other liquid marine varnish. this is the liquid component of the varnish of this invention.

One method for forming such particles is to crush or grind ultraviolet absorber-containing PMMA. PMMA can be comminuted to form particles in the desired size ranges using conventional crushing and grinding equipment. Best results are obtained when the temperature is below 0° C. at which temperature the PMMA is quite brittle. The following three varnishes, A, B, C, were prepared:

A. Commercial varnish (BENCHMARK™—Majorm Paint Co./, 29 volume percent polyurethane, 19 volume percent alkyd, balance solvent and amino additives sold by STANDARD BRANDS™).

B. One part by weight of translucent PMMA microparticles having an average diameter of less than 20 microns to two parts by weight of commercial varnish (BENCHMARK™—Majorm Paint Co./, 29 volume percent polyurethane, 19 volume percent alkyd, balance solvent and amino additives.

C. One part by weight of translucent PMMA microparticles having an average diameter of 75 to 125 microns to two parts by weight of commercial varnish (BENCHMARK™—Majorm Paint Co./, 29 volume percent polyurethane, 19 volume percent alkyd, balance solvent and amino additives.

Each of coatings A, B, C, was spread onto a glass pane thereby providing three test panels. Each pane had 2.2 gm of resin. The panes coated with samples B and C had, in addition, and 0.9 gm of 3.7 wt. % uv absorber—containing PMMA microparticles. The microparticles in the coating on plate B were less than 20 microns and the microparticles in the coating on plate C were 125±75 microns. Mar resistance and skid resistance of the three samples were compared by visual inspection of the three plates rubbed with 00 polishing paper. Plate C, having the larger microparticle size had superior mar resistance and skid resistance compared to plates B or C. A microwatt meter was used to determine if the embedded micro particles effectively increased the ultraviolet absorption of the varnish film. The films of the particle containing varnishes absorbed at least 34 units of ultraviolet radiation whereas the film of varnish only absorbed only 12 ultraviolet units.

What has been described has been examples of the invention which meet the objectives of providing a translucent coating and film from the coating which has superior resistance to mar or and skidding and resists degradation due to ultra violet light. Variations and modifications may be considered which are within the scope of the invention.

For example, although particles of polymethylmethacrylate are preferred, other crosslinked polymers may be used such as polycarbonate, epoxy, styrene, polyurethane. I therefore wish to define my invention by the appended claims.

I claim:

1. A liquid varnish for forming on a surface a substantially translucent film to confer on said surface the properties of mar and skid resistance, and resistance to degradation by ultraviolet light, said varnish including:

a clear varnish forming liquid polymer system;

particles of cross linked translucent polymer particles having an average diameter in a range of diameters extending from 20 microns to 200 microns that contain uv absorber;

said particles suspended in said liquid polymer system providing said liquid varnish for forming a substantially translucent film on said surface to confer on said surface the properties of mar and skid resistance and resistance to degradation by ultraviolet light.

2. The varnish of claim 1 wherein said particles are polymethylmethacrylate.

3. The varnish of claim 1 wherein said clear varnish forming liquid polymer system is one of:

(i) an aqueous dispersion of urethane polymer (ii) a drying oil based varnish.

4. A method for preparing a liquid varnish for forming a substantially translucent film on a surface to confer on said surface the properties of mar and skid resistance, and resistance to degradation by ultraviolet light, said method including the steps of:

(a) providing a clear varnish forming liquid polymer system;

(b) forming a translucent solid crosslinked polymer containing dissolved uv abasorber;

(c) comminuting said crosslinked polymer to obtain a powder having an average particle size selected from a range of between 20 to 200 microns;

(d) mixing said powder into said clear varnish forming liquid system whereby there is formed said liquid varnish for forming a substantially translucent film on a surface to confer on said surface the properties of mar and skid resistance, and resistance to degradation by ultraviolet light.

5. The method of claim 4 wherein said step (b) includes the step of selecting said crosslinked polymer from a group of crosslinked polymers that consists of polymethylmethacrylate, polycarbonates, styrene, polyurethane, epoxy.

6. A solid coherent substantially translucent film, formable on a surface and confering on said surface the properties of mar and skid resistance and resistance to ultraviolet radiation, comprising:

a clear dried varnish component, being essentially a substantially translucent solid coherent polymer film;

clear solid ultraviolet absorbing crosslinked polymer particles embedded in said clear dried varnish component;

an ultraviolet absorber compound contained by said particles;

said particles having an average diameter selected from a range between 20 to 200 microns whereby said substantially translucent film is provided formable on a surface and conferring on said surface the properties of mar and skid resistance and resistance to ultraviolet radiation.

* * * * *